(12) United States Patent
Liu

(10) Patent No.: US 12,488,204 B1
(45) Date of Patent: Dec. 2, 2025

(54) CARD READER

(71) Applicant: MAGIC CONTROL TECHNOLOGY CORPORATION, New Taipei (TW)

(72) Inventor: Pei-Chung Liu, New Taipei (TW)

(73) Assignee: MAGIC CONTROL TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 19/070,113

(22) Filed: Mar. 4, 2025

(30) Foreign Application Priority Data

Dec. 24, 2024 (TW) .................. 113150518

(51) Int. Cl.
*G06K 7/00* (2006.01)
*H01R 27/00* (2006.01)

(52) U.S. Cl.
CPC ............. *G06K 7/006* (2013.01); *H01R 27/00* (2013.01)

(58) Field of Classification Search
CPC ................................ G06K 7/006; H01R 27/00
See application file for complete search history.

(56) References Cited

U.S. PATENT DOCUMENTS

| | | | | |
|---|---|---|---|---|
| 7,296,741 B1* | 11/2007 | Kao | ............... | G06K 7/0047 235/440 |
| 7,479,041 B1* | 1/2009 | Chen | ............... | H01R 27/00 439/528 |
| 7,778,037 B2* | 8/2010 | Huang | ............ | G06K 19/07732 361/752 |
| 8,500,467 B2* | 8/2013 | Ni | ............... | H05K 5/0278 439/142 |
| 8,961,206 B1* | 2/2015 | Chen | ............... | H01R 13/6582 439/152 |
| 2006/0219776 A1* | 10/2006 | Finn | ............... | G06K 7/0043 235/380 |
| 2008/0026614 A1* | 1/2008 | Emerson | ............ | H01R 35/04 439/136 |
| 2009/0289119 A1* | 11/2009 | Liao | ............... | G06K 7/0021 235/441 |
| 2010/0267259 A1* | 10/2010 | Sun | ............... | H05K 5/0278 439/131 |
| 2014/0131442 A1* | 5/2014 | Morrow | ............ | G06K 7/0004 235/440 |
| 2015/0069124 A1* | 3/2015 | Yang | ............... | G06K 7/0004 235/440 |

(Continued)

OTHER PUBLICATIONS

CN 201527656U—Card reader, 17 pages. (Year: 2025).*

(Continued)

*Primary Examiner* — Tuyen K Vo
(74) *Attorney, Agent, or Firm* — NIXON PEABODY LLP

(57) ABSTRACT

The invention provides a card reader, which includes two USB connectors of two specifications hidden in the body. The two USB connectors are rotatably combined in the body, and a user can choose to use one of the USB connectors to rotate out one side of the body and position it to electrically connect to a main circuit board. A card slot is provided on the opposite side of the body. When one of the USB connectors is rotated out of the body and connected to an electronic device, a chip card inserted into the card slot can communicate with the electronic device. When not in use, the two USB connectors can be rotated into the body and the electrical connection is disconnected for easy storage and portability.

9 Claims, 17 Drawing Sheets

(56) References Cited

U.S. PATENT DOCUMENTS

2015/0099382 A1* 4/2015 Chang .................... H01R 27/02
439/152
2020/0349408 A1* 11/2020 Prawitz .............. G06K 19/0718

OTHER PUBLICATIONS

DE 102009057306A1—Universal serial bus connector for use with inbuilt card reader slot, has isolation substrate, where slot is formed between upper surface and wall surface, 21 pages. (Year: 2025).*

* cited by examiner ial No. 113150518, filed on Dec. 24, 2024, which is
CARD READER

CROSS-REFERENCE TO RELATED APPLICATION

This application claims the priority of Taiwanese patent application No. 113150518, filed on Dec. 24, 2024, which is incorporated herewith by reference.

BACKGROUND OF THE INVENTION

1. Field of the Invention

The present invention relates generally to a card reader for electrically connecting a chip card to an electronic device, and more particularly, to a card reader able to retract or expose two types of USB connectors by rotation.

2. The Prior Arts

There are many types of cards embedded with chips (hereinafter referred to as chip cards), such as bank cards, credit cards, health insurance cards, etc. The data stored in the chip needs to be connected to an electronic device (such as a computer, mobile phone, etc.) to be read, so a card reader is required as a connection medium between the chip card and the electronic device.

Currently, electronic devices are mainly equipped with USB (Universal Serial Bus) ports as interfaces for telecommunication connection with other electronic devices. Moreover, the specifications of the USB ports equipped vary depending on the time when the electronic device is manufactured. For example, the early USB1.0, USB1.1, USB2.0, USB3.0, etc. have evolved to the currently commonly used Type-C.

The method of connecting a chip card to an electronic device is to insert the chip card into a slot of a card reader to make electrical contact with the internal terminals, and then insert the USB connector of the card reader into the USB port of the electronic device. Conventional card readers are only provided with one specification of USB connector (e.g., Taiwan Patent No. M567909), so when encountering electronic devices equipped with different specifications, it is necessary to use or even purchase a card reader of the corresponding specification, which is inconvenient to use and wastes money.

SUMMARY OF THE INVENTION

A primary objective of the present invention is to provide a card reader including two USB connectors of different specifications, and the USB connectors can be conveniently hidden and stored when not in use.

The card reader provided by the present invention includes: a body, having an opening and a slot; a main circuit board, disposed in the body and having a plurality of first conductive terminals and a plurality of second conductive terminals, all electrically connected to the main circuit board; a first USB connector module, rotatably disposed inside the body comprising a first circuit board and a first USB connector electrically connected to the first circuit board, the first circuit board having a plurality of first conductive metals; a first rotation member, rotatably disposed inside the body and fixedly connected to the first USB module; a second USB connector module, rotatably disposed inside the body comprising a second circuit board and a second USB connector electrically connected to the second circuit board, the second circuit board having a plurality of second conductive metals; and a second rotation member, rotatably disposed inside the body and fixedly connected to the second USB module; wherein the first rotation member controls the first USB connector module to rotate back-and-forth, when the first USB connector module rotates to expose the first USB connector to the opening to a predetermined position, the plurality of first conductive terminals electrically contacts the plurality of first conductive metals; the second rotation member controls the second USB connector module to rotate back-and-forth, when the second USB connector module rotates to expose the second USB connector to the opening to a predetermined position, the plurality of first conductive terminals electrically contacts the plurality of second conductive metals; and wherein when a card is inserted into the slot, a chip on the card electrically contacts the plurality of second conductive terminals. As such, the user can not only choose to expose a corresponding USB connector in the card reader for use according to the USB port specifications of the electronic device, but also conveniently hide the two USB connectors in the body when not in use to facilitate storage and carrying.

In a preferred embodiment of the present invention, the first USB connector module further comprises a first fixing block, connected to the first rotation member and formed into a block-shaped body, with one corner cut to form a first beveled side, for example, of 45°; the second USB connector module also comprises a second fixing block, connected to the second rotation member and formed into a block-shaped body, with one corner cut to form a second beveled side, for example, of 45°; wherein, when the first USB connector or the second USB connector is completely exposed from the body, the first beveled side of the first fixing block and the second beveled side of the second fixing block abut against each other, so that the first USB connector and the second USB connector are maintained at an angle of 90°, and the first fixing block and the second fixing block push each other to rotate; thereby, more convenient to use.

Preferably, the present invention can dispose the opening and the slot on opposite sides of the body. Accordingly, the USB connector exposed on one side of the body can be inserted into the USB connection port of the electronic device, and the other side of the body can be used to insert a chip card.

Preferably, a positioning portion is disposed at the opening of the body, and when the first conductive terminals are in electrical contact with the first conductive metals, the positioning portion positions the first rotation member, and when the first conductive terminals are in electrical contact with the second conductive metals, the positioning portion positions the second rotation member. As such, the positioned first rotation member can prevent the first USB connector from shaking, and the positioned second rotation member can prevent the second USB connector from shaking, and thereby beneficial for plugging the first USB connector or the second USB connector into the USB connection port of the electronic device.

In a preferred embodiment of the present invention, the positioning portion comprises an elastic portion formed on the body and a positioning block formed on the elastic portion; the first rotation member is provided with a first positioning recess, and when the first conductive terminals are in electrical contact with the first conductive metals, the elasticity of the elastic portion enables the first positioning recess and the positioning block to engage with each other to position the first USB connector module; and the second rotation member is provided with a second positioning recess, and when the first conductive terminals are in electrical contact with the second conductive metals, the elasticity of the elastic portion enables the second positioning recess and the positioning block to engage with each other to position the second USB connector module. As such, the first USB connector or the second USB connector can be automatically positioned by elasticity after rotating out of the body to a predetermined position, and the first USB connector or the second USB connector can be rotated into the body after manually overcoming the elasticity to release the positioning.

In another embodiment of the present invention, the positioning portion comprises a tenon and a push button slidably provided on the body, and the tenon and the push button are connected to each other; the first rotation member is provided with a first positioning recess, and when the first conductive terminals are in electrical contact with the first conductive metals, the first positioning recess corresponds to the tenon, and the first USB connector module is positioned by pushing the push button to embed the tenon into the first positioning recess, and the positioning is released by pushing the push button in the opposite direction to disengage the tenon from the first positioning recess; and the second rotation member is provided with a second positioning recess, and when the first conductive terminals are in electrical contact with the second conductive metals, the second positioning recess corresponds to the tenon, and the first USB connector module is positioned by pushing the push button to embed the tenon into the second positioning recess, and the positioning is released by pushing the push button in the opposite direction to disengage the tenon from the second positioning recess. Thereby, the first USB connector or the second USB connector can be positioned manually after being rotated out of the body to a predetermined position, and can be rotated into the body after being released manually.

In a preferred embodiment of the present invention, a circular through hole is provided in the body, a circular seat body is provided in the center of the through hole, and an annular groove is formed between inner periphery of the through hole and outer periphery of the seat body; the first rotation member is formed with a first USB connector mount, a first arc plate, and a first handle, the first USB connector mount is disposed with the first USB connector, when the first rotation member is provided on the body, the first arc plate covers a part of the annular groove and the first handle protrudes from the annular groove, and the first arc plate can slide along the annular groove; and the second rotation member is formed with a second USB connector mount, a second arc plate, and a second handle, the second USB connector mount is disposed with the second USB connector, when the second rotation member is provided on the body, the second arc plate covers another part of the annular groove and the second handle protrudes from the annular groove, the second arc plate and the first arc plate are staggered with each other in the height direction, and can slide along the annular groove. Thereby, the user can conveniently turn the first handle to rotate the first USB connector in and out of the body, or turn the second handle to rotate the second USB connector in and out of the body.

Preferably, in the present invention, the first arc plate and the second arc plate can both be formed into a C shape with an included angle of about 270°. Thereby, the first arc plate and the second arc plate match with each other to cover the annular groove.

In a preferred embodiment of the present invention, a Type-C USB connector is used as the first USB connector, and a USB connector other than the Type-C USB connector is used as the second USB connector.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The technical solutions of the present invention will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

Figure 1:
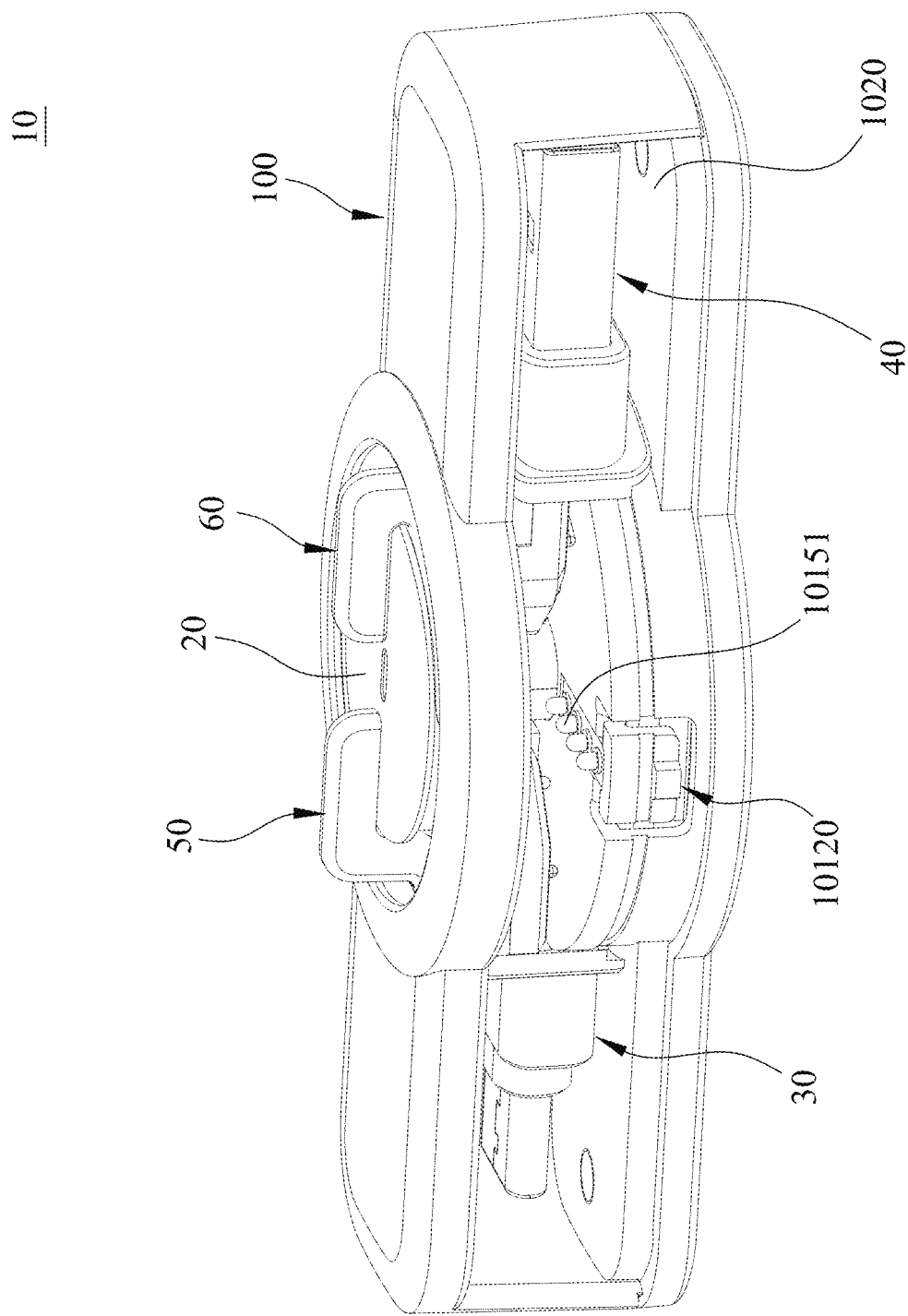
FIG. 1 is a perspective view showing the appearance structure of a card reader of the present invention.
Figure 10:
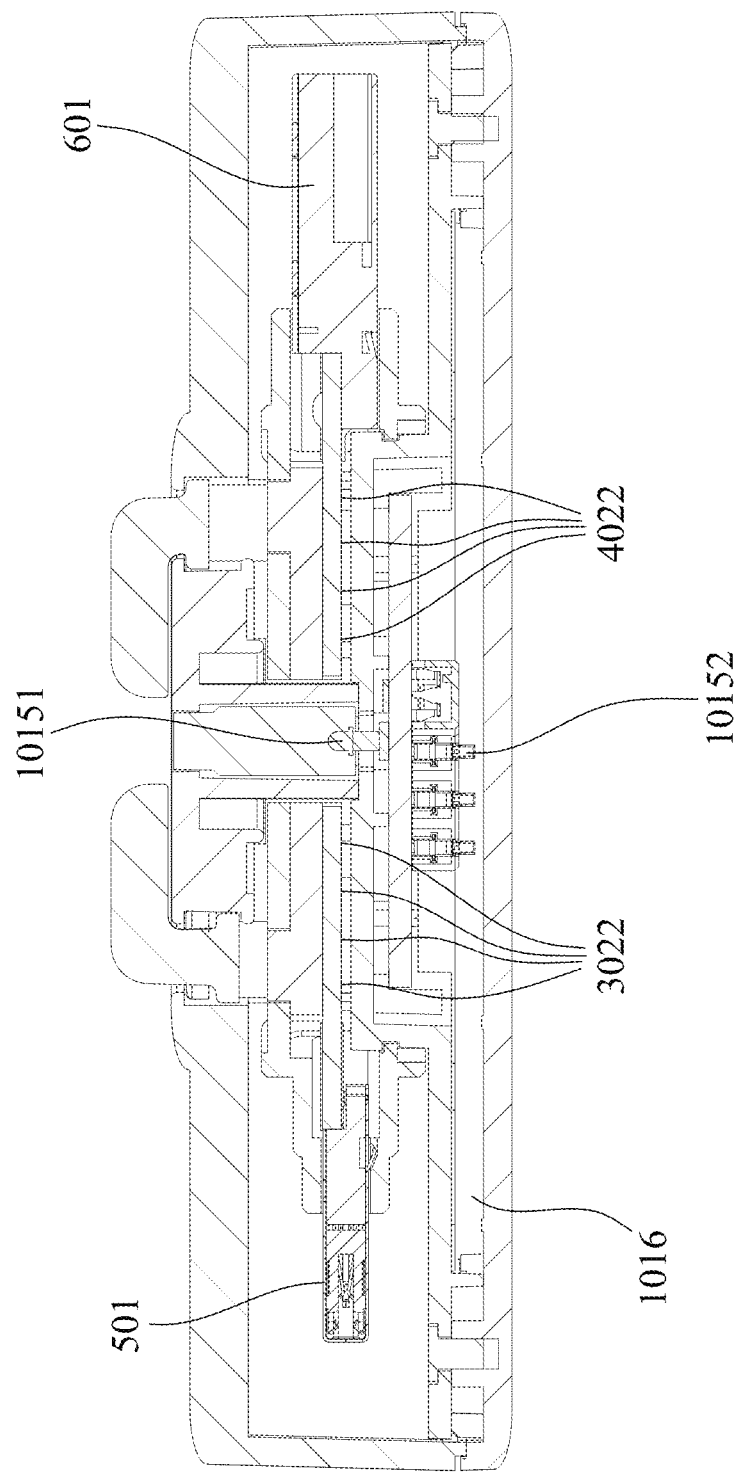
FIG. 10 is a planar cross-sectional view showing the structure of the card reader after assembly of the present invention.

FIG. 1 shows that the card reader 10 of the present invention has a long body 100, and opposite sides of the body 100 respectively form a larger opening 1020 and a narrow slot 1016 (as shown in FIG. 10). The first USB connector module 30 and the second USB connector module 40 of different specifications are arranged at the opposite ends inside the body 100. The first USB connector module 30 and the second USB connector module 40 are respectively connected to the first rotation member 50 and the second rotation member 60. The user can operate the first rotation member 50 to rotate the first USB connector module 30 out of the opening 1020 and be positioned by a positioning portion 10120, or operate the second rotation member 60 to rotate the second USB connector module 40 out of the opening 1020 and be positioned by the positioning portion 10120.

Figure 2:
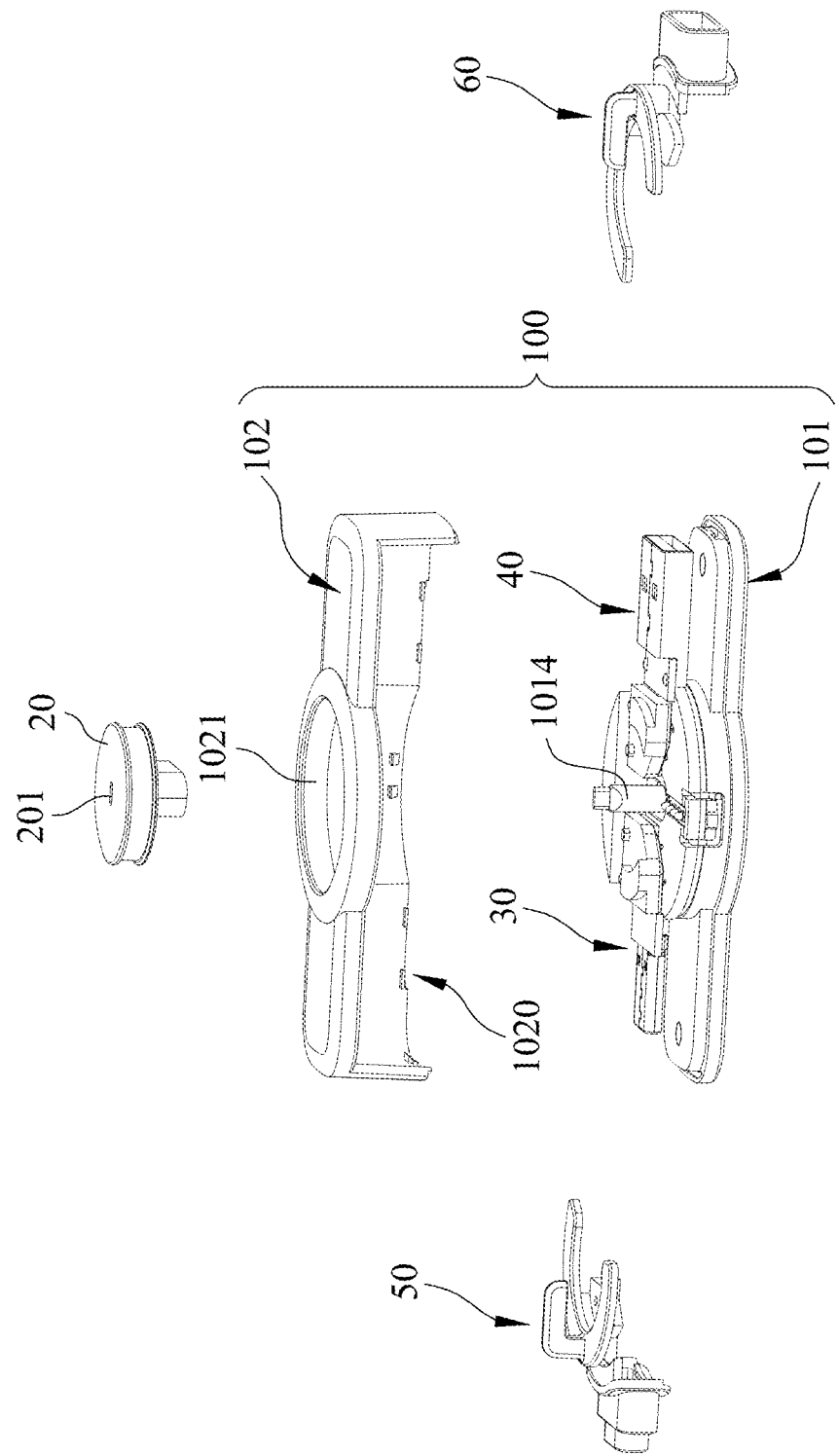
FIG. 2 is a perspective exploded view showing the card reader in FIG. 1 after the body is opened, with the base, the first rotation member, and the second rotation member separated.
Figure 3:
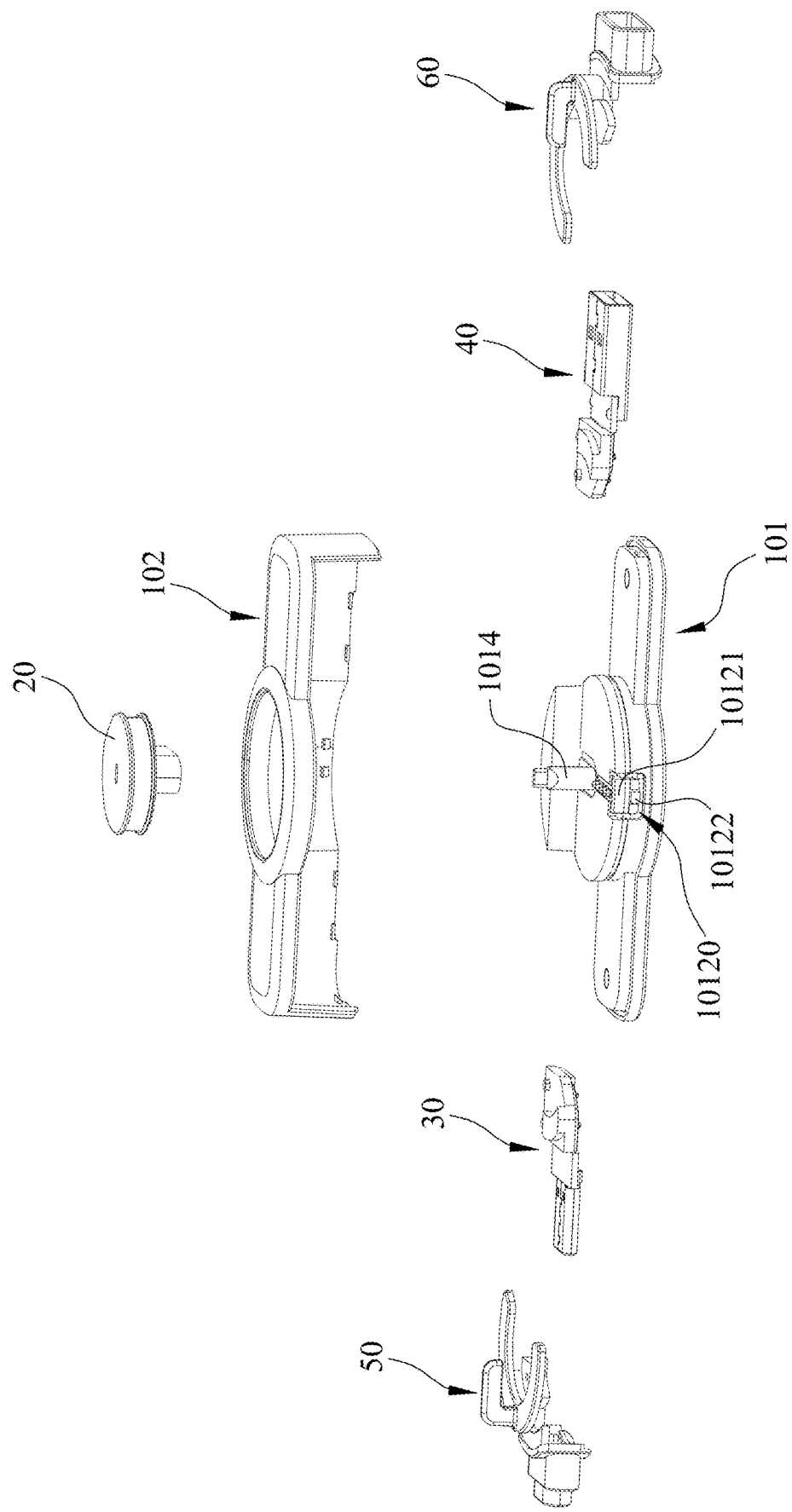
FIG. 3 is a perspective exploded view showing the first USB connector module and the second USB connector module in FIG. 2 after being separated from the body.

FIG. 2 and FIG. 3 show that the body 100 comprises a base 101 and a shell 102, wherein the shell 102 is a hollow shell having the opening 1020 formed on one side thereof and a circular through hole 1021 formed on the upper surface. A central shaft 1014 is erected in the center of the base 101, and the first USB connector module 30 and the second USB connector module 40 are respectively arranged on opposite sides of the base 101 with the central shaft 1014 as the center, and are arranged in a straight line when both are fully accommodated in the body 100. The first rotation member 50 is connected to the first USB connection module 30, and the second rotation member 60 is connected to the second USB connection module 40. The positioning portion 10120 is disposed on one side of the base 101 in the same direction as the opening 1020. The end of the central shaft 1014 is formed into a non-circular shape and passes through the slot 201 of a circular seat body 20 to fix the seat body 20 in the through hole 1021. The outer diameter of the seat body 20 is smaller than the inner diameter of the through hole 1021, so that a circular ring-shaped gap is formed between the outer edge of the seat body 20 and the inner edge of the through hole 1021.

Figure 4:
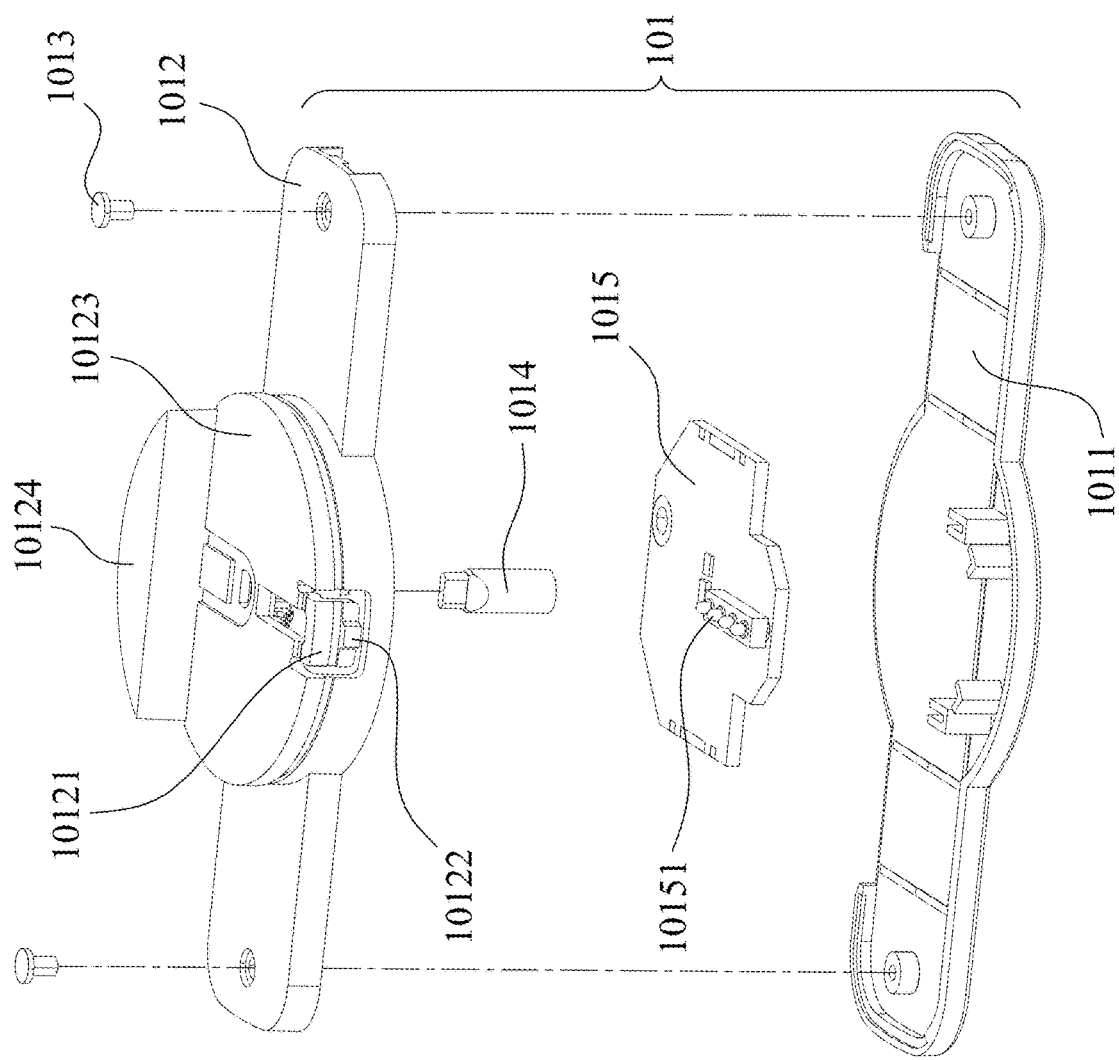
FIG. 4 is a perspective exploded view showing the base structure of the body in FIG. 3.
Figure 9:
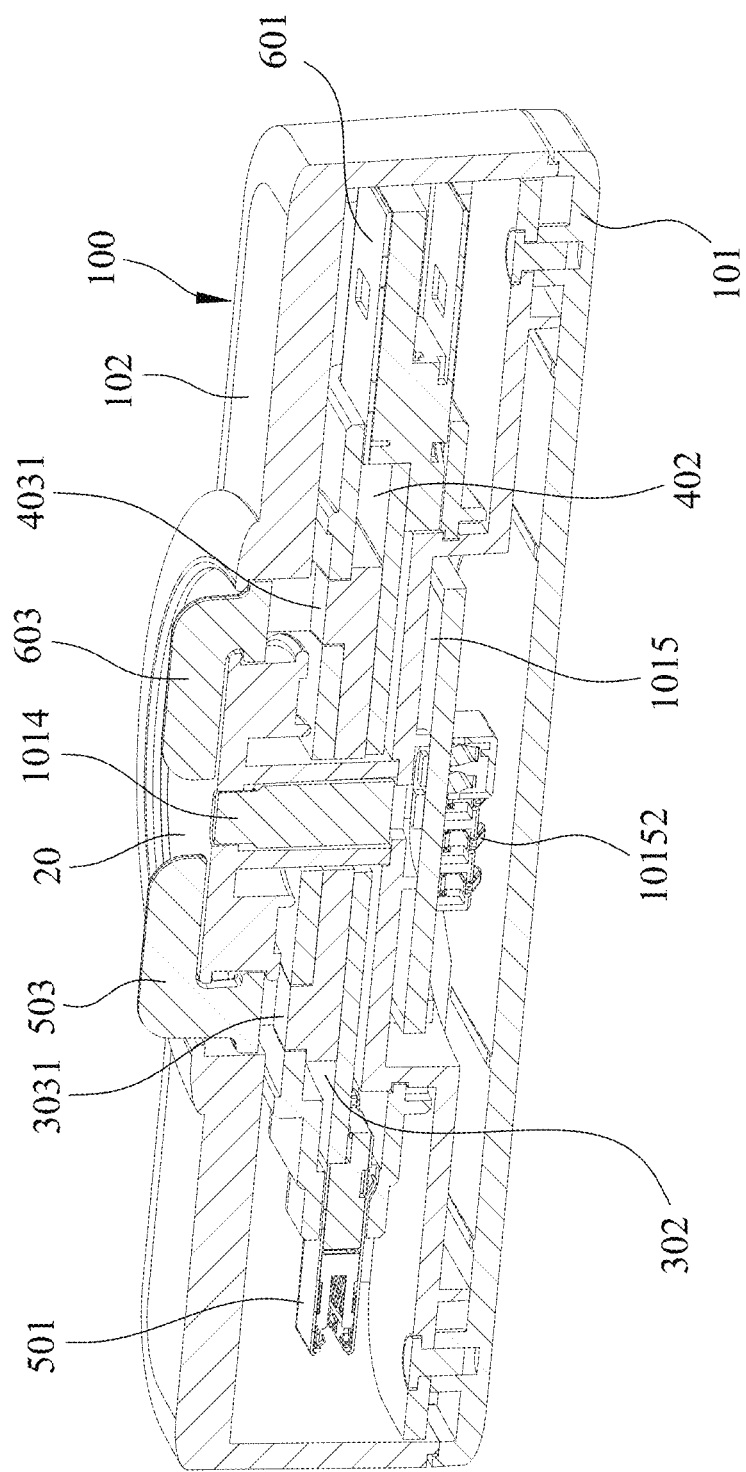
FIG. 9 is a perspective cross-sectional view showing the structure of the assembled card reader of the present invention.

FIG. 4 further shows that the base 101 structure includes a lower shell 1011 and an upper shell 1012, which are fastened together to form the base 101 via screws 1013; wherein a circular protruding platform 10123 is formed in the center of the upper shell 1012, and a protrusion 10124 is formed on one side of the protruding platform 10123, and the aforementioned positioning portion 10120 is arranged at the central position of one side of the protruding platform 10123 and preferably integrally formed with the protruding platform 10123. For example, a notch is formed at the central position of the side of the protruding platform 10123, and an elastic portion 10121 with a positioning block 10122 on the surface is integrally formed in the notch, the opposite sides of the elastic portion 10121 are connected to the protruding platform 10123 only by a thinner rod, and the rest of the portion is suspended, thereby allowing the elastic portion 10121 to have appropriate elasticity. A main circuit board 1015 is disposed between the upper shell 1012 and the lower shell 1011, and a plurality of first conductive terminals 10151 arranged in a straight line along the width direction of the body 100 are configured to be electrically connected on the upper side of the main circuit board 1015. A plurality of second conductive terminals 10152 arranged in a straight line along the length direction of the body 100 are configured to be electrically connected on the lower side of the main circuit board 1015 (as shown in FIG. 9). Wherein, the first conductive terminals 10151 are closer to the opening 1020, and the second conductive terminals 10152 are closer to the slot 1016. The central shaft 1014 passes through the axis hole of the upper shell 1012 from the inside of the base 101 and stands upright at the center position of the protruding platform 10123.

Figure 5:
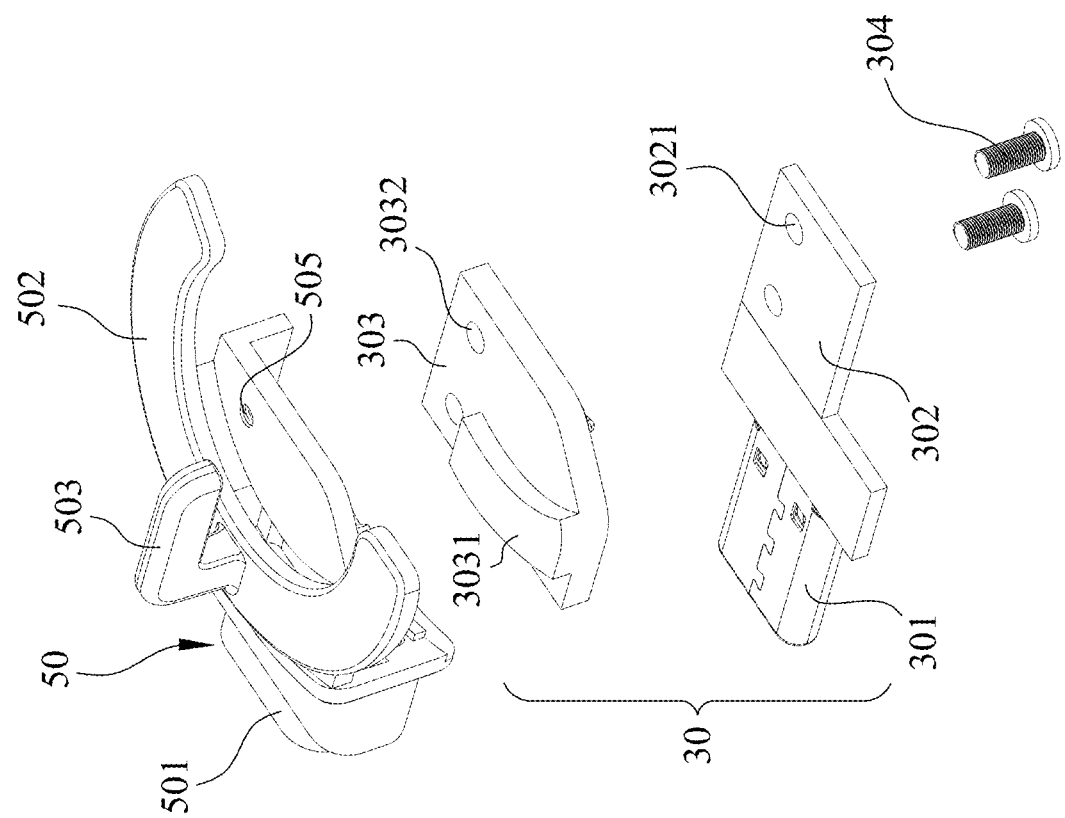
FIG. 5 is a perspective exploded view showing the combined structure of the first rotation member and the first USB connector module of the present invention.
Figure 6:
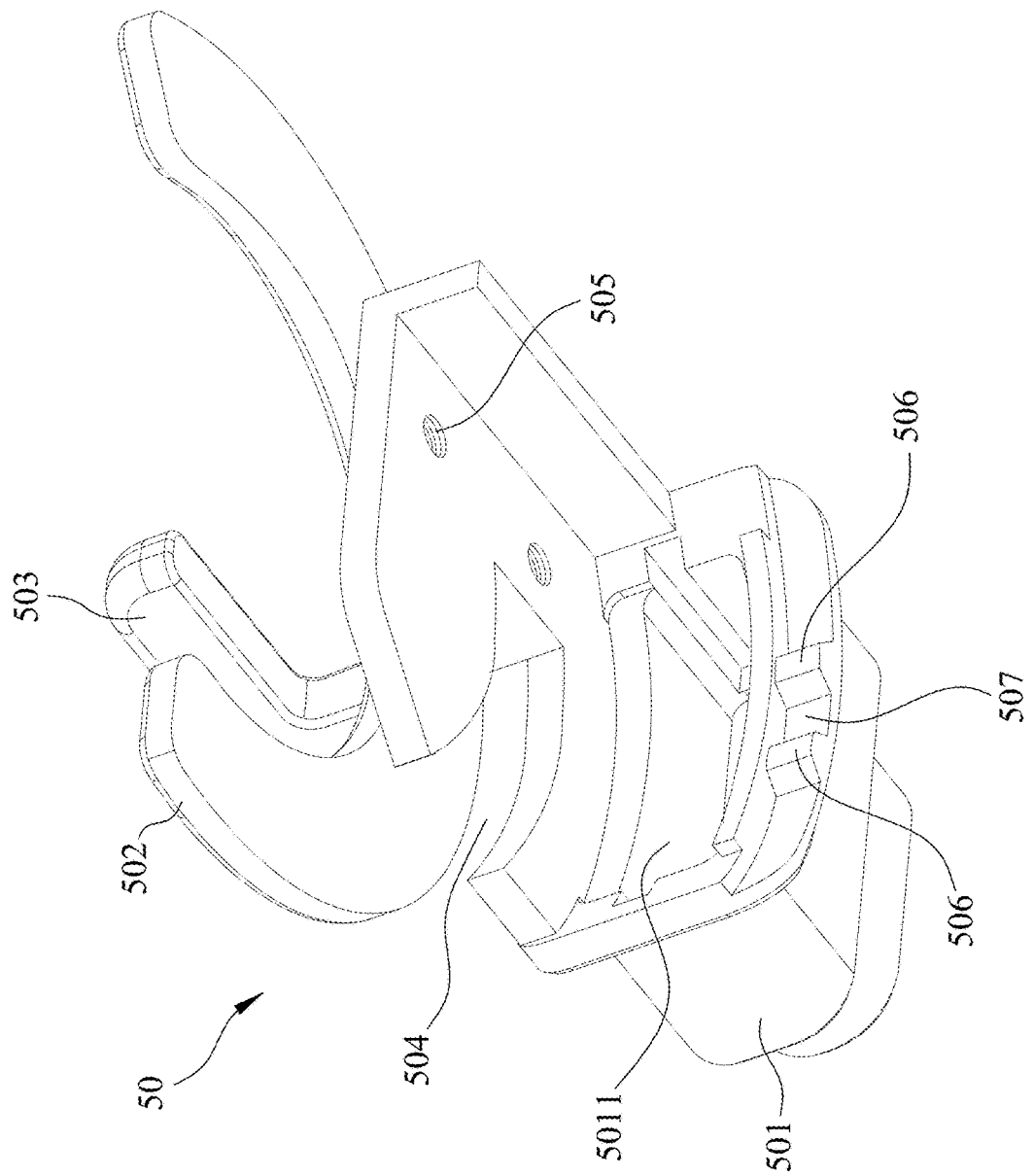
FIG. 6 is a perspective view showing the structure of the first rotation member from another angle.

FIGS. 5 and 6 further show the structures of the first USB connector module 30 and the first rotation member 50 in assembly relationship; wherein, the first USB connector module 30 includes a first circuit board 302, a first USB connector 301 electrically connected to the first circuit board 302, and a first fixing block 303; the first circuit board 302 is provided with a plurality of first conductive metals 3022 (as shown in FIG. 10, i.e., located on the lower surface of the first circuit board 302 shown in FIG. 5), and a plurality of holes 3021 are provided on the first circuit board 302. In an embodiment of the present invention, a USB Type-C connector is used as the first USB connector 301.

The first fixing block 303 is an element for connecting the first rotation member 50 and the first USB connector module 30. The first fixing block 303 is formed as a block body and has a plurality of holes 3032 corresponding to the aforementioned holes 3021. A first arc rail 3031 is formed on a surface of one side, and one corner end is cut to form a first bevel 3033, for example, a cut angle of 45°.

The first rotation member 50 is preferably integrally formed with a first arc plate 502, and a first handle 503 (such as the L-shaped handle shown in FIG. 5) is formed on the upper surface of the first arc plate 502. Preferably, the first arc plate 502 is formed in a C shape; the plate body connected below the first arc plate 502 is provided with a plurality of first screw holes 505 corresponding to the aforementioned holes 3021, 3032, and a first USB connector mount 501 is connected to the side of the plate body. A first arc groove 504 is formed between the side of the first USB connector mount 501 and the outer edge of the first arc plate 502, and the arc of the first arc groove 504 is the same as the arc of the first arc rail 3031 formed on the first fixing block 303 so that the first arc rail 3031 can be matched into the first arc groove 504. The first USB connector mount 501 is formed with a first inner space 5011 for mounting the first USB connector 301. After the first USB connector 301 is inserted into the first inner space 5011 and protrudes to the outside, screws 304 pass through the aforementioned hole 3021, 3032 and then lock into the first screw hole 505 to fix, or the screws 304 can be replaced by fixing elements such as pins, rivets, hooks, etc. to complete the assembly of the first rotation member 50 and the first USB connector module 30. Furthermore, two first positioning protrusions 506 are formed at the middle position of the lower edge of the first USB connector mount 501, and a first positioning recess 507 for matching and positioning with the positioning block 10122 is formed between the two first positioning protrusions 506.

Figure 7:
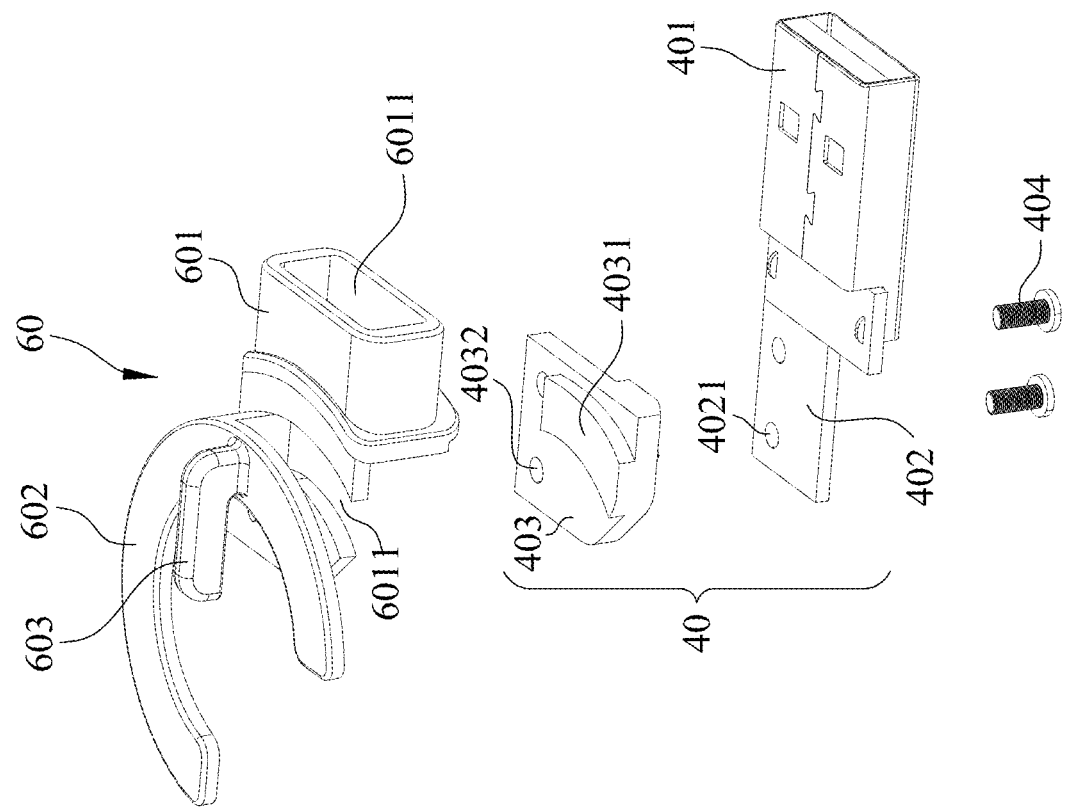
FIG. 7 is a perspective exploded view showing the combined structure of the second rotation member and the second USB connector module of the present invention.
Figure 8:
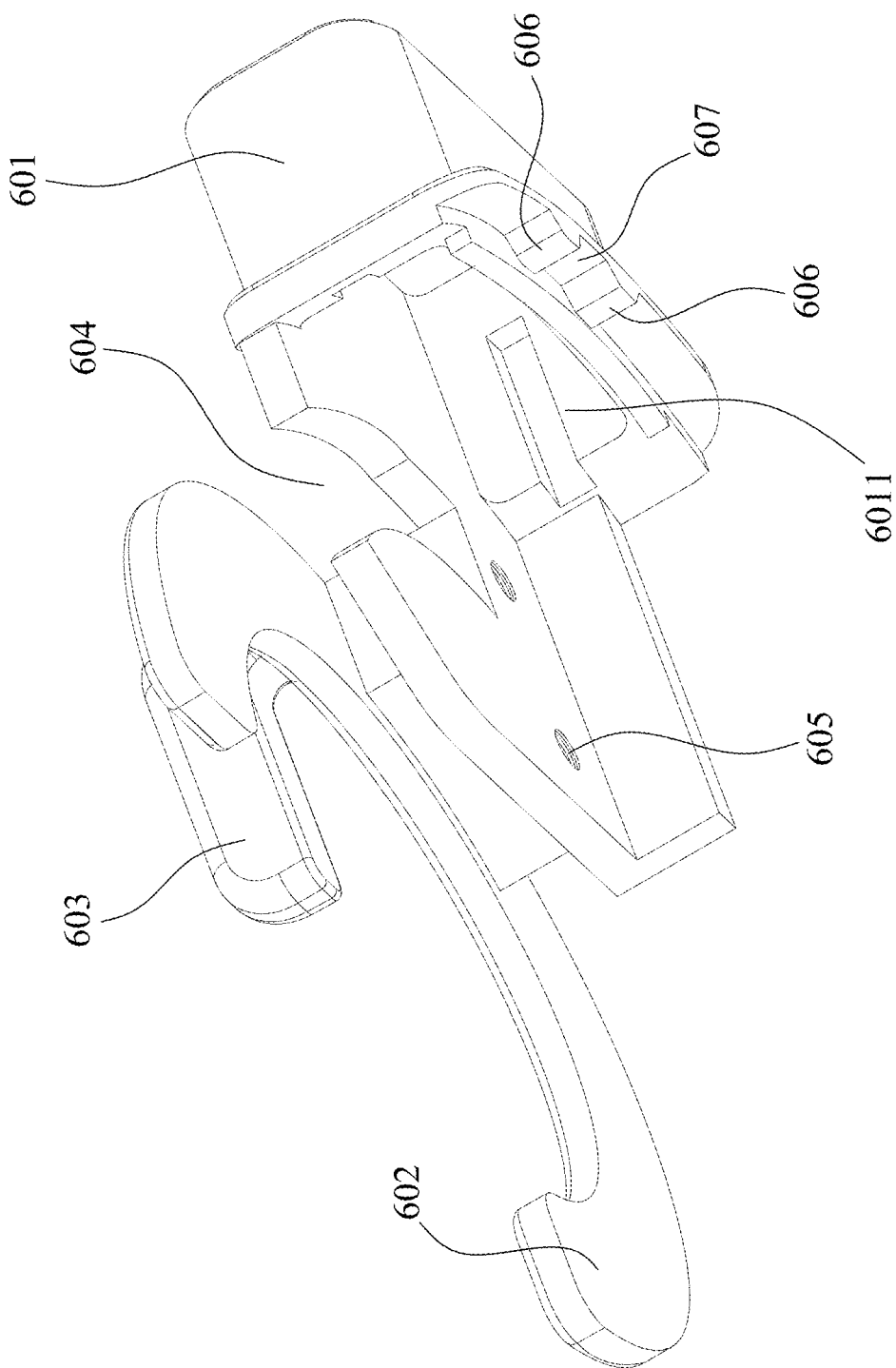
FIG. 8 is a perspective view showing the structure of the second rotation member from another angle.

FIGS. 7 and 8 further show the structures of the second USB connector module 40 and the second rotation member 60 in assembly relationship; wherein, the second USB connector module 40 includes a second circuit board 402, a second USB connector 401 electrically connected to the second circuit board 402, and a second fixing block 403, the second circuit board 402 is provided with a plurality of second conductive metals 4022 (as shown in FIG. 10, i.e., located on the lower surface of the second circuit board 402 shown in FIG. 7), and a plurality of holes 4021 are provided on the second circuit board 402. In an embodiment of the present invention, a USB connector other than a USB Type-C connector (e.g., Type-A) is used as the second USB connector 401.

The second fixing block 403 serves as an element connecting the second rotation member 60 and the second USB connector module 40. The second fixing block 403 is formed as a block body and has a plurality of holes 4032 corresponding to the aforementioned holes 4021, and a second arc rail 4031 is formed on one side surface, and one corner end is cut to form a second bevel 4033, for example, a cut angle of 45°.

The second rotation member 60 is preferably integrally formed with a second arc plate 602, and a second handle 603 (such as the L-shaped handle shown in FIG. 7) is formed on the upper surface of the second arc plate 602. Preferably, the second arc plate 602 is formed in a C shape; the plate body connected below the second arc plate 602 is provided with a plurality of second screw holes 605 corresponding to the aforementioned holes 4021, 4032, and a second USB connector mount 601 is connected to the side of the plate body. A second arc groove 604 is formed between the side of the second USB connector mount 601 and the outer edge of the second arc plate 602, and the arc of the second arc groove 604 is the same as the arc of the second arc rail 4031 formed on the second fixing block 403 so that the second arc rail 4031 can be matched into the second arc groove 504. The second USB connector mount 601 is formed with a second inner space 6011 for mounting the second USB connector 401. After the second USB connector 401 is inserted into the second inner space 6011 and protrudes to the outside, screws 404 pass through the aforementioned hole 4021, 4032 and then lock into the second screw hole 506 to fix, or the screws 404 can be replaced by fixing elements such as pins, rivets, hooks, etc. to complete the assembly of the second rotation member 60 and the second USB connector module 40. Furthermore, two second positioning protrusions 606 are formed at the middle position of the lower edge of the second USB connector mount 601, and a second positioning recess 607 for matching and positioning with the positioning block 10122 is formed between the two first positioning protrusions 606.

In addition, the first arc plate 502 and the second arc plate 602 are both formed into a C shape with an angle of approximately 270°, and the height of the second arc plate 602 relative to the second USB connector mount 601 is greater than the height of the aforementioned first arc plate 502 relative to the first USB connector mount 501, so that when the first arc plate 502 and the second arc plate 602 are disposed in the through hole 1021, the first arc plate 502 and the second arc plate 602 are staggered in the height direction to cover the circular through hole.

Figure 11:
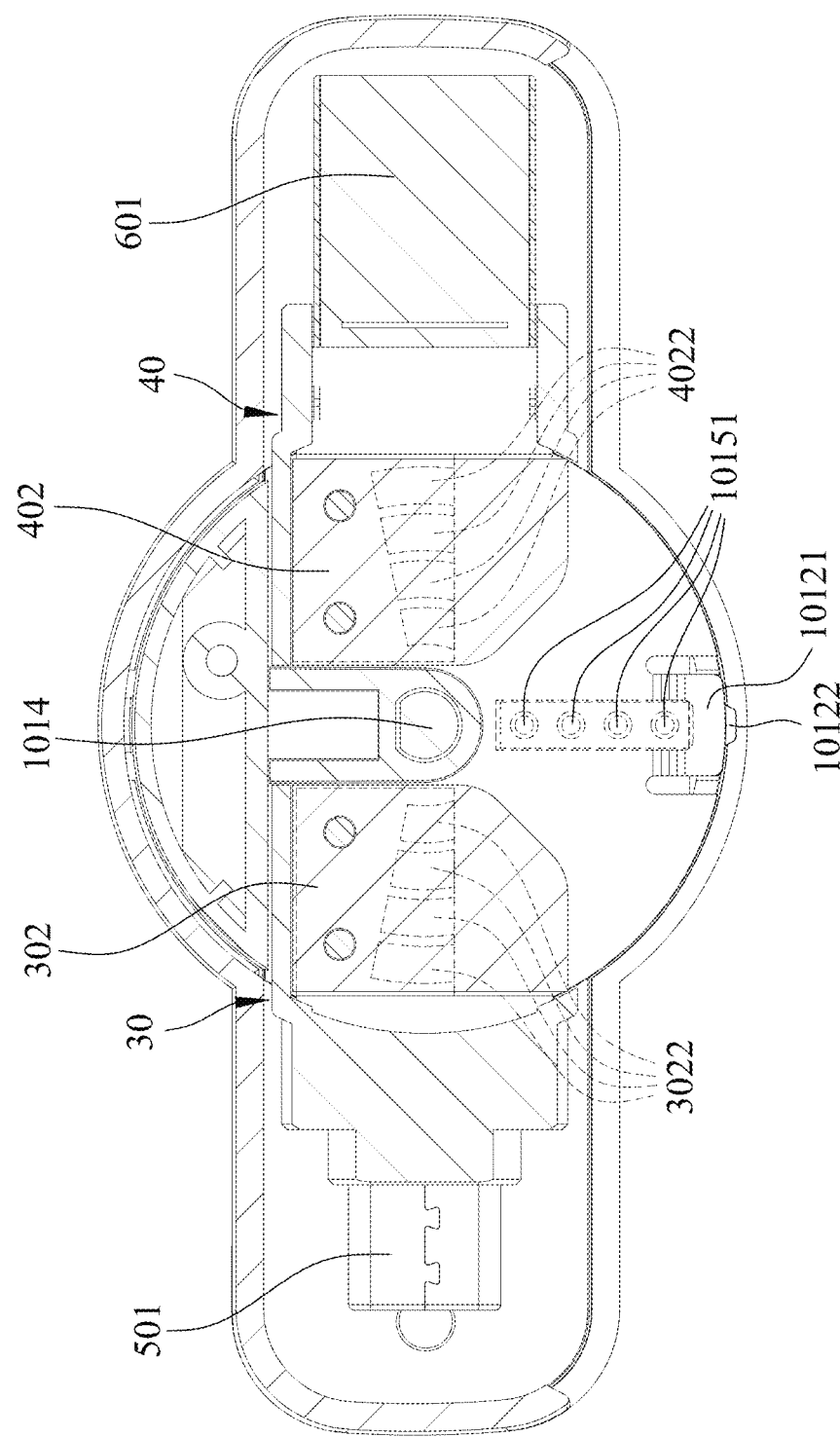
FIG. 11 is a schematic planar cross-sectional view showing that the first USB connector module and the second USB connector module of the present invention are both received in the body.

After the first USB connector module 30 and the first rotation member 50 are assembled, and after the second USB connector module 40 and the second rotation member 60 are assembled, they are installed together between the base 101 and the shell 102, so that the first handle 503 and the second handle 603 are exposed on the through hole 1021 of the shell 102, and at the same time, the first arc plate 502 and the second arc plate 602 are staggered from each other in the height direction to cover the circular through hole 1021. The assembled structure is shown in FIGS. 9 to 11.

Figure 12:
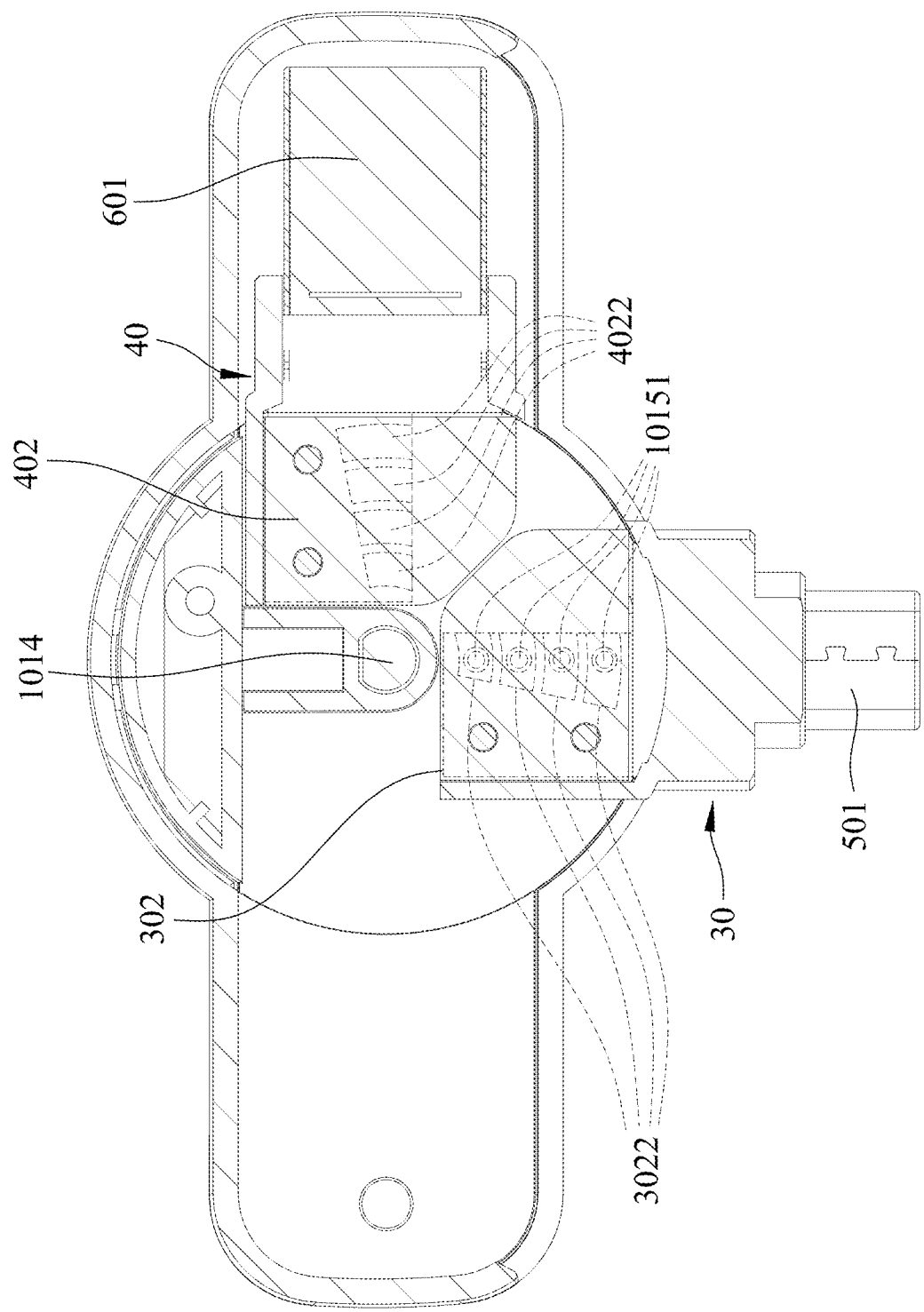
FIG. 12 is a schematic cross-sectional view showing that the first USB connector module of the present invention is rotated out of the body, and the second USB connector module is received in the body.
Figure 14:
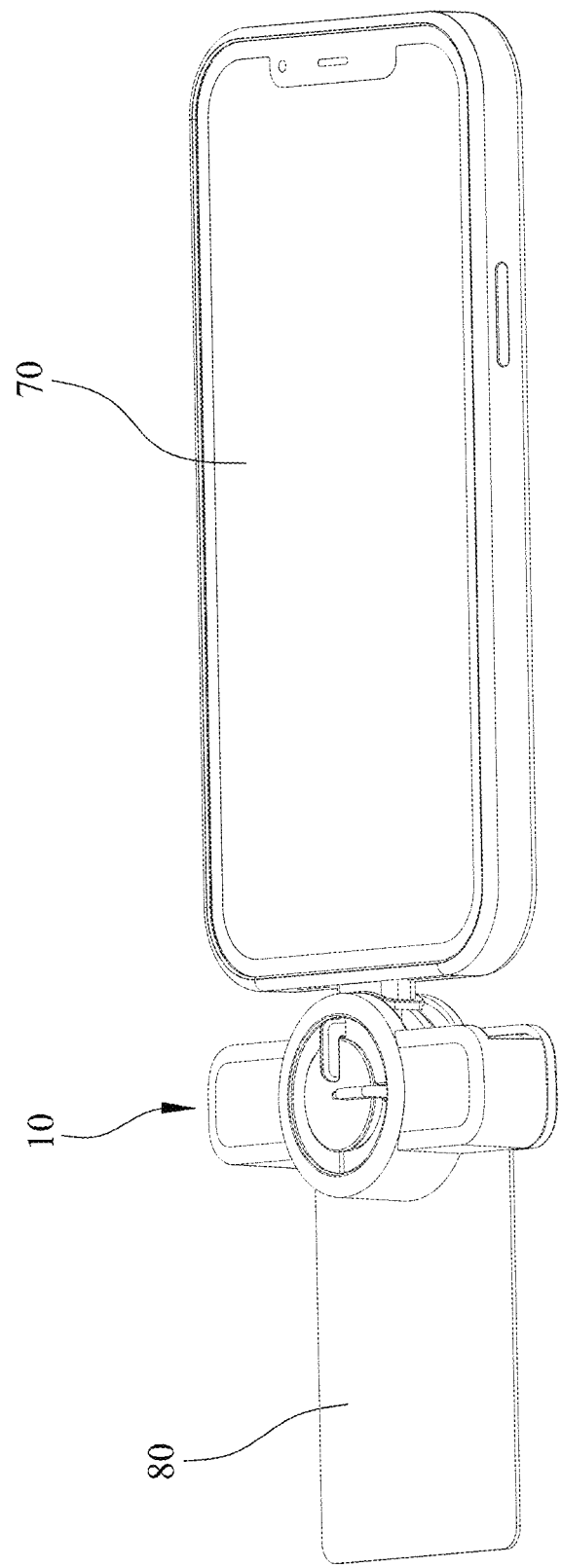
FIG. 14 is a schematic view showing a card reader of the present invention being used to connect an electronic device and a chip card.

With the aforementioned card reader 10 of the present invention, when a user needs to connect a chip card 80 (as shown in FIG. 14) to the USB Type-C interface of the electronic device 70 through a USB Type-C connector, the first handle 503 is operated to rotate the first rotation member 50 to rotate the first USB connector 301 out of the opening 1020 until a predetermined position. After the first positioning recess 507 corresponds to the positioning block 10122, the positioning block 10122 is embedded in the first positioning recess 507 by using the elastic force of the elastic portion 10121 to position the first USB connector 301. At the same time, the plurality of first conductive metal 3022 provided on the lower surface of the first circuit board 302 is in electrical contact with each first conductive terminals 10151 at the same time (as shown in FIG. 12) In this state, the center line of the port of the first USB connector 301 is perpendicular to the length direction of the body 100, and the first bevel 3033 of the corner end of the first fixing block 303 and the second bevel 4033 of the corner end of the second fixing block 403 abut each other, making the first USB connector 301 and the second USB connector 401 maintain a 90° included angle between the first USB connector 301 and the second USB connector 401. The slot 1016 located on the other side of the body 100 is used to insert the chip card 80 into, so that the chip on the chip card 80 and each second conductive terminals 10152 are electrically contacted. In other words, the chip card 80 is electrically connected to the USB Type-C interface of the main circuit board 1015 and the electronic device 70 to transmit and receive electronic data with each other. When not in use, the first rotation member 50 can be operated in reverse to store the first USB connector 301 into the body 100.

Figure 13:
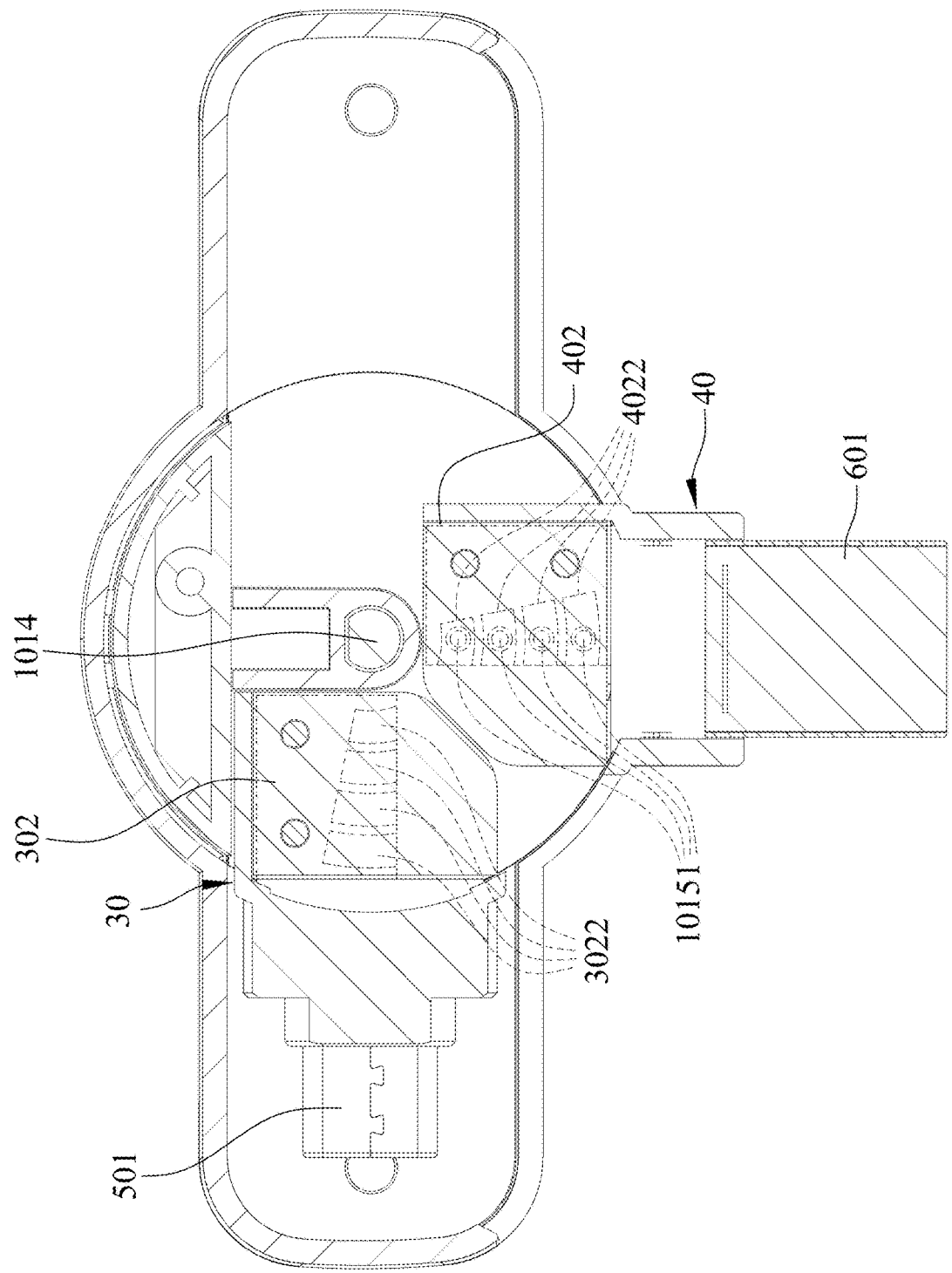
FIG. 13 is a schematic cross-sectional view showing that the second USB connector module of the present invention is rotated out of the body, and the first USB connector module is received in the body.

Similarly, when a user needs to connect the chip card to the USB interface of an electronic device through a USB connector of a specification other than the USB Type-C connector, the second handle 603 is operated to rotate the second rotation member 603, in a state where both the first USB connector 301 and the second USB connector 401 are stored in the body 100, to rotate the second USB connector 401 to the opening 1020 until the predetermined position where the second positioning recess 607 and the positioning block 10122 correspond to each other, and the positioning block 10122 is embedded in the second positioning recess 607 by the elastic force of the elastic portion 10121 so as to position the second USB connector 401. At the same time, the plurality of second conductive metals 4022 provided on the lower surface of the second circuit board 402 is simultaneously in respective electrical contact with the first conductive terminals 10151 (as shown in FIG. 13). In this state, the center line of the port of the second USB connector 401 is perpendicular to the length direction of the body 100, and the second bevel 4033 of the corner end of the second fixing block 403 and the first bevel 3033 of the corner end of the first fixing block 303 abut against each other, making the first USB connector 301 and the second USB connector 401 maintain a 90° included angle between the first USB connector 301 and the second USB connector 401. The slot 1016 located on the other side of the body 100 is used to insert the chip card 80 into, so that the chip on the chip card 80 and each second conductive terminals 10152 are electrically contacted. In other words, the chip card 80 is electrically connected to the USB interface of the main circuit board 1015 and the electronic device 70 to transmit and receive electronic data with each other. When not in use, the second rotation member 60 can be operated in reverse to store the second USB connector 401 into the body 100.

Since the first USB connector 301 or the second USB connector 401 is completely exposed from the body 100, the first bevel 3033 of the first fixing block 303 and the second bevel 4033 of the second fixing block 403 will abut against each other. Therefore, when the user wants to change to the second USB connector 401 after using the first USB connector 301, the user can directly operate the second rotation member 60 to rotate the second USB connector 401 out of the body 100. At the same time, the second fixing block 403 will push the first fixing block 303 to rotate and store the first USB connector 301 into the body 100. Alternatively, when the user wants to switch to the first USB connector 301 after using the second USB connector 401, the user can directly operate the first rotation member 50 to rotate the first USB connector 301 out of the body 100. Meanwhile, the first fixing block 303 will push the second fixing block 403 to rotate and store the second USB connector 401 into the body 100. That is, the first fixing block 303 and the second fixing block 403 can push and rotate with each other via the first bevel 3033 and the second bevel 4033, so that the second USB connector 401 exposed outside the body 100 can be rotated into the body 100 while the first USB connector 301 is rotated out of the body 100, or the first USB connector 301 exposed outside the body 100 can be rotated into the body 100 while the second USB connector 401 is rotated out of the body 100.

Figure 15:
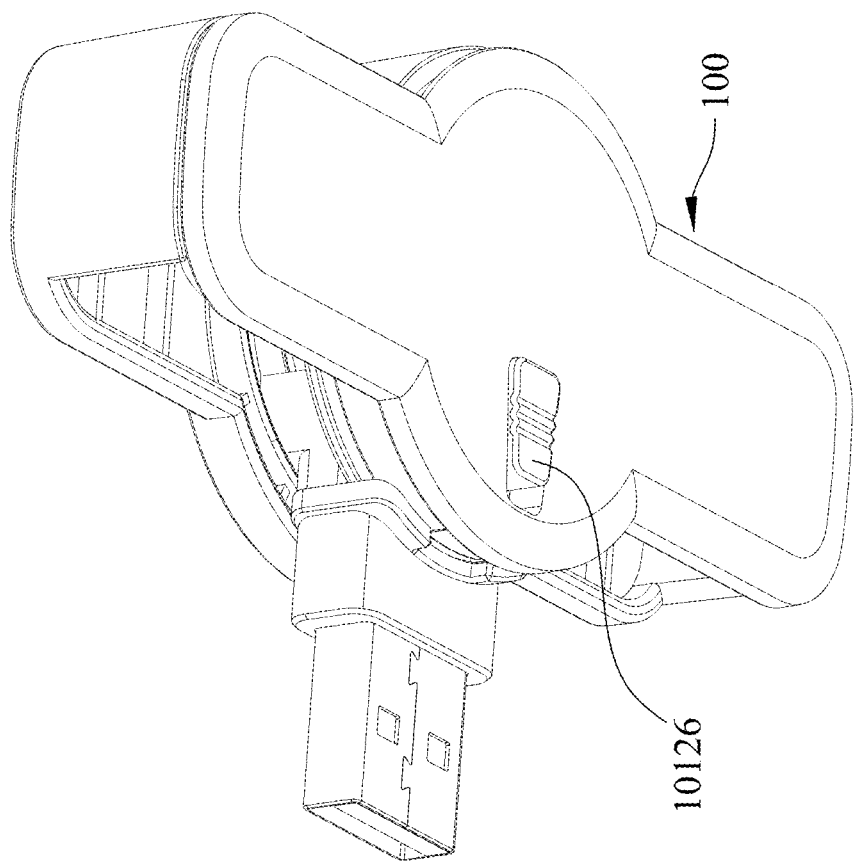
FIG. 15 is a partial perspective view showing the positioning portion structure of the second embodiment of the present invention.
Figure 16:
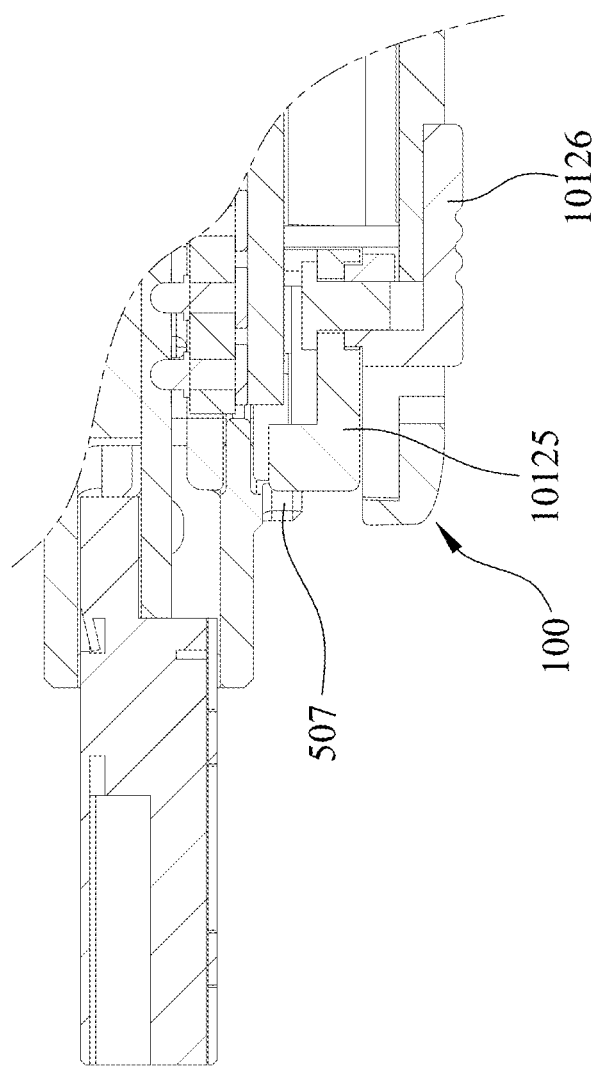
FIG. 16 is a partial planar cross-sectional view showing the positioning portion of the second embodiment of the present invention positioning the first rotation member.
Figure 17:
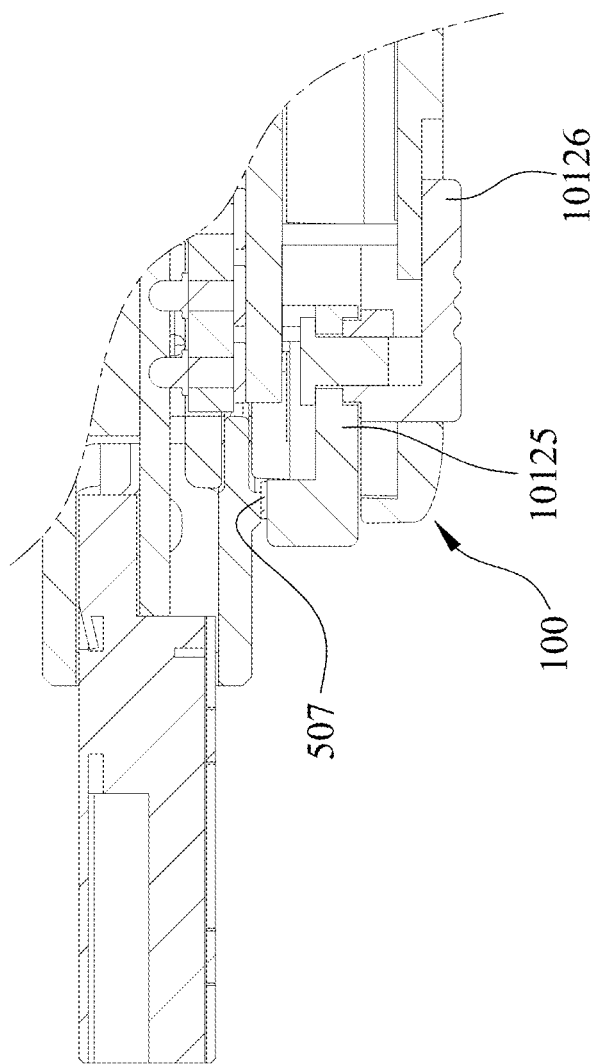
FIG. 17 is a partial planar cross-sectional view showing the positioning portion of the second embodiment of the present invention releasing the first rotation member from the position.

FIGS. 15 to 17 show a second embodiment of the aforementioned positioning portion 10120; the positioning portion 10120 of the aforementioned first embodiment uses the elasticity of the elastic portion 10121 to fit the positioning block 10122 and the first positioning recess 507 or the second positioning recess 607 into position; however, in the second embodiment, the fixation of the first USB connector 301 and the second USB connector 401 can be controlled manually.

As shown in FIG. 15, the second embodiment of the positioning portion 10120 includes a tenon 10125 and a push button 10126 slidably disposed on the body 100, and the tenon 10125 and the push button 10126 are connected to each other. By manually operating the push button 10126, the tenon 10125 can be controlled to extend out of the body 100 or retract into the body 100. Accordingly, when the first USB connector 301 or the second USB connector 401 is operated to rotate out of the body 100 and to a predetermined positioning position, the first positioning recess 507 of the first rotation member 50 or the second positioning recess 607 of the second rotation member 60 corresponds to the tenon 10125. At this point, the tenon 10125 is embedded in the first positioning recess 507 by pushing the push button 10126 to position the first USB connector module 30 (as shown in FIG. 16), or the tenon 10125 is embedded in the second positioning recess 607 to position the second USB connector module 40. The push button 10126 is pushed in the opposite direction to disengage the tenon 10125 from the first positioning recess 507 or the second positioning recess 607 to release the positioning (as shown in FIG. 17).

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A card reader, comprising:
a body, having an opening and a slot;
a main circuit board, disposed in the body and having a plurality of first conductive terminals and a plurality of second conductive terminals, all electrically connected to the main circuit board;
a first USB connector module, rotatably disposed inside the body comprising a first circuit board and a first USB connector electrically connected to the first circuit board, the first circuit board having a plurality of first conductive metals;
a first rotation member, rotatably disposed inside the body and fixedly connected to the first USB module;
a second USB connector module, rotatably disposed inside the body comprising a second circuit board and a second USB connector electrically connected to the second circuit board, the second circuit board having a plurality of second conductive metals; and
a second rotation member, rotatably disposed inside the body and fixedly connected to the second USB module;
wherein the first rotation member controls the first USB connector module to rotate back-and-forth, when the first USB connector module rotates to expose the first USB connector to the opening to a predetermined position, the plurality of first conductive terminals electrically contacts the plurality of first conductive metals;
wherein the second rotation member controls the second USB connector module to rotate back-and-forth, when the second USB connector module rotates to expose the second USB connector to the opening to a predetermined position, the plurality of first conductive terminals electrically contacts the plurality of second conductive metals; and
wherein when a card is inserted into the slot, a chip on the card electrically contacts the plurality of second conductive terminals.

2. The card reader according to claim 1, wherein:
the first USB connector module further comprises a first fixing block, connected to the first rotation member and formed into a block-shaped body, with one corner cut to form a first beveled side;
the second USB connector module also comprises a second fixing block, connected to the second rotation member and formed into a block-shaped body, with one corner cut to form a second beveled side; and
wherein, when the first USB connector or the second USB connector is completely exposed from the body, the first beveled side of the first fixing block and the second beveled side of the second fixing block abut against each other, so that the first USB connector and the second USB connector are maintained at an angle of 90°, and the first fixing block and the second fixing block push each other to rotate.

3. The card reader according to claim 1, wherein the opening and the slot are disposed on two opposite sides of the body.

4. The card reader according to claim 3, wherein:

a positioning portion is disposed at the opening of the body, and when the first conductive terminals are in electrical contact with the first conductive metals, the positioning portion positions the first rotation member, and when the first conductive terminals are in electrical contact with the second conductive metals, the positioning portion positions the second rotation member, wherein the positioned first rotation member configured to prevent the first USB connector from shaking, and the positioned second rotation member can prevent the second USB connector from shaking, and thereby beneficial for plugging the first USB connector or the second USB connector into the USB connection port of the electronic device.

5. The card reader according to claim 4, wherein:

the positioning portion comprises an elastic portion formed on the body and a positioning block formed on the elastic portion;

the first rotation member is provided with a first positioning recess, and when the first conductive terminals are in electrical contact with the first conductive metals, the elasticity of the elastic portion enables the first positioning recess and the positioning block to engage with each other to position the first USB connector module; and the second rotation member is provided with a second positioning recess, and when the first conductive terminals are in electrical contact with the second conductive metals, the elasticity of the elastic portion enables the second positioning recess and the positioning block to engage with each other to position the second USB connector module.

6. The card reader according to claim 4, wherein:

the positioning portion comprises a tenon and a push button slidably provided on the body, and the tenon and the push button are connected to each other;

the first rotation member is provided with a first positioning recess, and when the first conductive terminals are in electrical contact with the first conductive metals, the first positioning recess corresponds to the tenon, and the first USB connector module is positioned by pushing the push button to embed the tenon into the first positioning recess, and the positioning is released by pushing the push button in the opposite direction to disengage the tenon from the first positioning recess; and the second rotation member is provided with a second positioning recess, and when the first conductive terminals are in electrical contact with the second conductive metals, the second positioning recess corresponds to the tenon, and the first USB connector module is positioned by pushing the push button to embed the tenon into the second positioning recess, and the positioning is released by pushing the push button in the opposite direction to disengage the tenon from the second positioning recess.

7. The card reader according to claim 1, wherein:

a circular through hole is provided in the body, a circular seat body is provided in the center of the through hole, and an annular groove is formed between inner periphery of the through hole and outer periphery of the seat body;

the first rotation member is formed with a first USB connector mount, a first arc plate, and a first handle, the first USB connector mount is disposed with the first USB connector, when the first rotation member is provided on the body, the first arc plate covers a part of the annular groove and the first handle protrudes from the annular groove, and the first arc plate can slide along the annular groove; and the second rotation member is formed with a second USB connector mount, a second arc plate, and a second handle, the second USB connector mount is disposed with the second USB connector, when the second rotation member is provided on the body, the second arc plate covers another part of the annular groove and the second handle protrudes from the annular groove, the second arc plate and the first arc plate are staggered with each other in the height direction, and can slide along the annular groove.

8. The card reader according to claim 7, wherein the first arc plate and the second arc plate can both be formed as C-shaped.

9. The card reader according to claim 1, wherein the first USB connector is a Type-C USB connector and the second USB connector is a USB connector other than the Type-C USB connector.

\* \* \* \* \*